(12) United States Patent
Su et al.

(10) Patent No.: US 11,498,159 B2
(45) Date of Patent: Nov. 15, 2022

(54) WELDING MECHANISM FOR MANUFACTURING A BI-COMPOSITIONAL SCREW

(71) Applicant: TAIWAN SHAN YIN INTERNATIONAL CO., LTD., Kaohsiung (TW)

(72) Inventors: Kou-Tsair Su, Kaohsiung (TW); Chen-Long Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 992 days.

(21) Appl. No.: 16/234,973

(22) Filed: Dec. 28, 2018

(65) Prior Publication Data

US 2020/0206847 A1   Jul. 2, 2020

(51) Int. Cl.
*B23K 37/00* (2006.01)
*B23K 31/02* (2006.01)
*B23K 37/053* (2006.01)
*B23K 101/00* (2006.01)

(52) U.S. Cl.
CPC ............ *B23K 31/02* (2013.01); *B23K 37/053* (2013.01); *B23K 37/0538* (2013.01); *B23K 2101/00* (2018.08)

(58) Field of Classification Search
CPC .. B23K 31/02; B23K 37/053; B23K 2101/00; B23K 37/0276; B23K 9/0253; B23K 9/0288; B23K 11/065; B23K 11/066; B23K 11/093; B23K 11/0935; B23K 31/027; B23K 37/0536; B23K 37/0538; B23K 26/0823

USPC .............................. 228/48–49.3; 219/59.1–67
See application file for complete search history.

(56) References Cited

U.S. PATENT DOCUMENTS

| | | | |
|---|---|---|---|
| 2,964,610 A * | 12/1960 | Mackey | B23K 13/046 219/84 |
| 4,736,481 A | 4/1988 | Hulsey | |
| 5,205,466 A | 4/1993 | Ker | |
| 2001/0040179 A1* | 11/2001 | Tochigi | B23K 37/0538 228/2.1 |
| 2003/0205560 A1* | 11/2003 | Desloge | B23K 9/167 219/125.11 |

(Continued)

FOREIGN PATENT DOCUMENTS

KR   101397939 B1 *  5/2014

*Primary Examiner* — Kiley S Stoner
(74) *Attorney, Agent, or Firm* — Rosenberg, Klein & Lee (57) ABSTRACT

A welding mechanism for welding different blank sections includes a welding device and a carrier. The carrier has a base, two opposite positioning members, an operating set disposed between the positioning members and driven by a power source, and a holding member and a pushing member which are respectively disposed relative to the positioning members. The blank sections, including a front section and a rear section, are separately placed on the operating set. The front section is restricted by the holding member. The pushing member pushes the rear section, so the two sections meet at a joint. When the two sections rotate synchronously along with the rotation of the operating set, the welding device welds the two sections at the joint circumferentially to produce a bi-compositional screw, thereby preventing the generation of air and pores inside the joint after welding, increasing processing quality, and reducing processing costs.

9 Claims, 7 Drawing Sheets

(56) References Cited

U.S. PATENT DOCUMENTS

| | | | |
|---|---|---|---|
| 2005/0244247 A1 | 11/2005 | Shinjo | |
| 2009/0017924 A1 | 1/2009 | Hsieh | |
| 2010/0301019 A1* | 12/2010 | Vos | B23K 37/0276 |
| | | | 219/136 |
| 2011/0109030 A1* | 5/2011 | Flaig | B23K 37/0538 |
| | | | 219/60 A |
| 2012/0279949 A1* | 11/2012 | Simmons | B23K 37/0538 |
| | | | 219/159 |
| 2020/0101565 A1* | 4/2020 | Li | B23K 26/0624 |
| 2020/0206848 A1* | 7/2020 | Su | B23K 31/02 |
| 2022/0055078 A1* | 2/2022 | Guo | B08B 7/0042 |

\* cited by examiner

WELDING MECHANISM FOR MANUFACTURING A BI-COMPOSITIONAL SCREW

BACKGROUND OF THE INVENTION

1. Field of the Invention

This invention relates to a welding mechanism and relates particularly to a welding mechanism for manufacturing a bi-compositional screw.

2. Description of the Related Art

A bi-compositional screw is made through welding two blank sections which are provided with different materials together.

Generally, the two materials of the blank sections are processed into a head portion and a drilling portion of the bi-compositional screw respectively. The drilling portion is usually made of a material with the higher strength in order to allow the drilling portion to screw into an object which is provided with larger hardness such as an iron plate effectively. On the other hand, the head portion is usually made of an antirust material such as stainless steel because the head portion is exposed to the air after the screwing operation is finished. Hence, the bi-compositional screw is provided with the antirust effect and the higher strength to attain a preferable screwing action.

The welding operation of a conventional welding mechanism for manufacturing a bi-compositional screw is to prepare two blank sections which includes a front section made of a first material and a rear section made of a second material different from the first material of the front section. An end of the front section forms a front welding surface, and an end of the rear section forms a rear welding surface. Afterward the front section and the rear section are positioned on the welding mechanism to contact together closely and meet at a joint, and thence rub the front welding surface against the rear welding surface to increase the temperature of the joint.

The joint of the front welding surface and the rear welding surface further melts caused by the frictional heat to combine the front and rear sections into the bi-compositional screw. However, the rubbing operation will generate air and pores inside the joint after welding to result in the reduced strength and poor quality of the bi-compositional screw. Meanwhile, the rubbing operation will cause that part of the front section and the rear section are pressed to produce waste extruded outwards of the joint. And, the waste is carbide formed under the high temperature. Therefore, the waste needs to be softened before removing that results in the increased costs and additional processes. Further, the processing difficulty is also increased. Thus, the conventional welding mechanism still needs to be improved.

SUMMARY OF THE INVENTION

The object of this invention is to provide a welding mechanism for manufacturing a bi-compositional screw capable of reducing welding waste, increasing processing quality and decreasing processing costs.

The welding mechanism of this invention comprises a welding device and at least one carrier fitted under the welding device for positioning blank sections which have a front section and a rear section that are provided with different materials. The carrier has a base positioned below the welding device, two spaced positioning members fitted on the base, an operating set fitted between the two positioning members and defining two separate rooms for placing the front and rear sections, a holding member fitted on the base relative to one positioning member, a pushing member movably fitted on the base relative to another positioning member, and a power source connected to the operating set. During a welding operation, the front and rear sections are positioned in the two rooms respectively to allow the holding member to restrict the front section and allow the pushing member to push the rear section toward a direction of the holding member to further cause a front welding surface of the front section to closely contact a rear welding surface of the rear section and meet at a joint. Afterward the power source carries out a rotation of the operating set and simultaneously rotates the front and rear sections. Meanwhile, the welding device welds the front and rear sections at the joint circumferentially to produce a bi-compositional screw with the rotation of the front and rear sections, thereby preventing air and pores from generating inside the joint, increasing processing quality, and reducing processing costs.

Preferably, the operating set has two shafts pivotally fitted between the positioning members and connected to and activated by the power source, and a first loading portion and a second loading portion respectively fitted on each shaft. The rooms include a first room formed between the first loading portions of the two shafts for accommodating the rear section and a second room formed between the second loading portions of the two shafts for accommodating the front section.

Preferably, a presser is disposed above the carrier relative to the operating set for restricting a movement of the front section and the rear section.

Preferably, the operating set has two gears meshing with the power source.

Preferably, the first loading portions and the second loading portions of the operating set are spaced from each other.

Preferably, both of the front welding surface and the rear welding surface are formed in a flat surface.

DETAILED DESCRIPTION OF THE PREFERRED EMBODIMENTS

Figure 1:
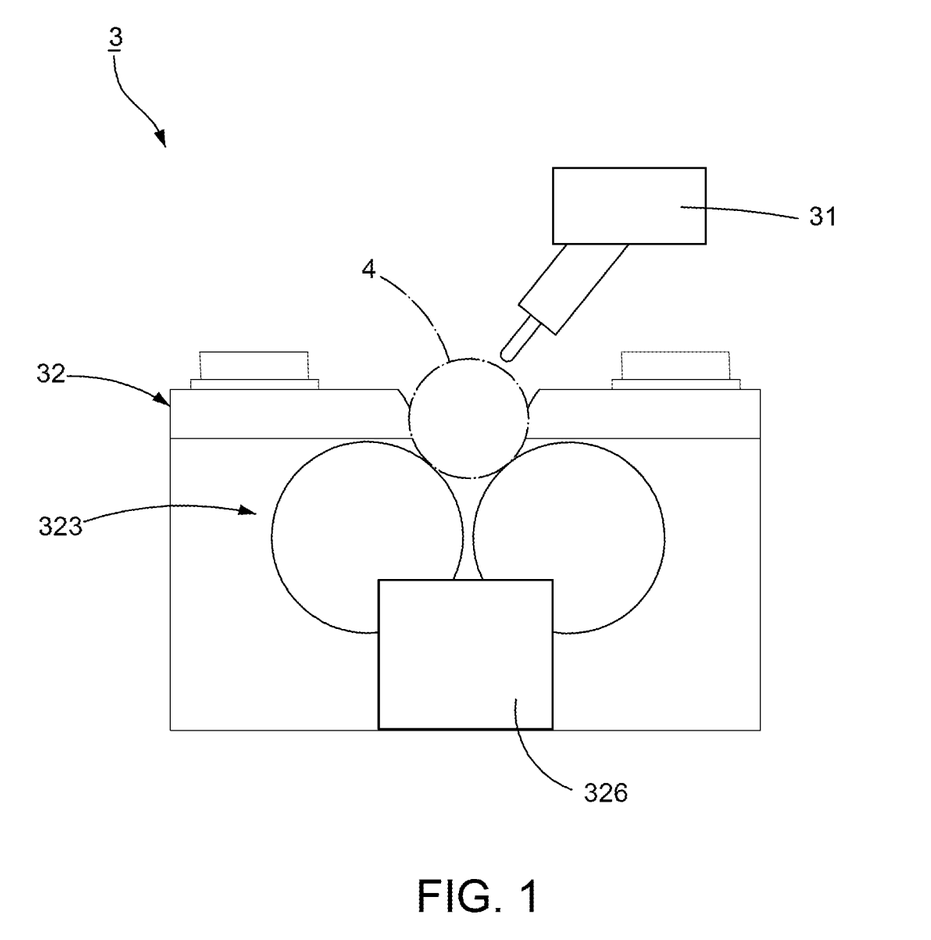
FIG. 1 is a schematic view showing a first preferred embodiment of this invention.
Figure 2:
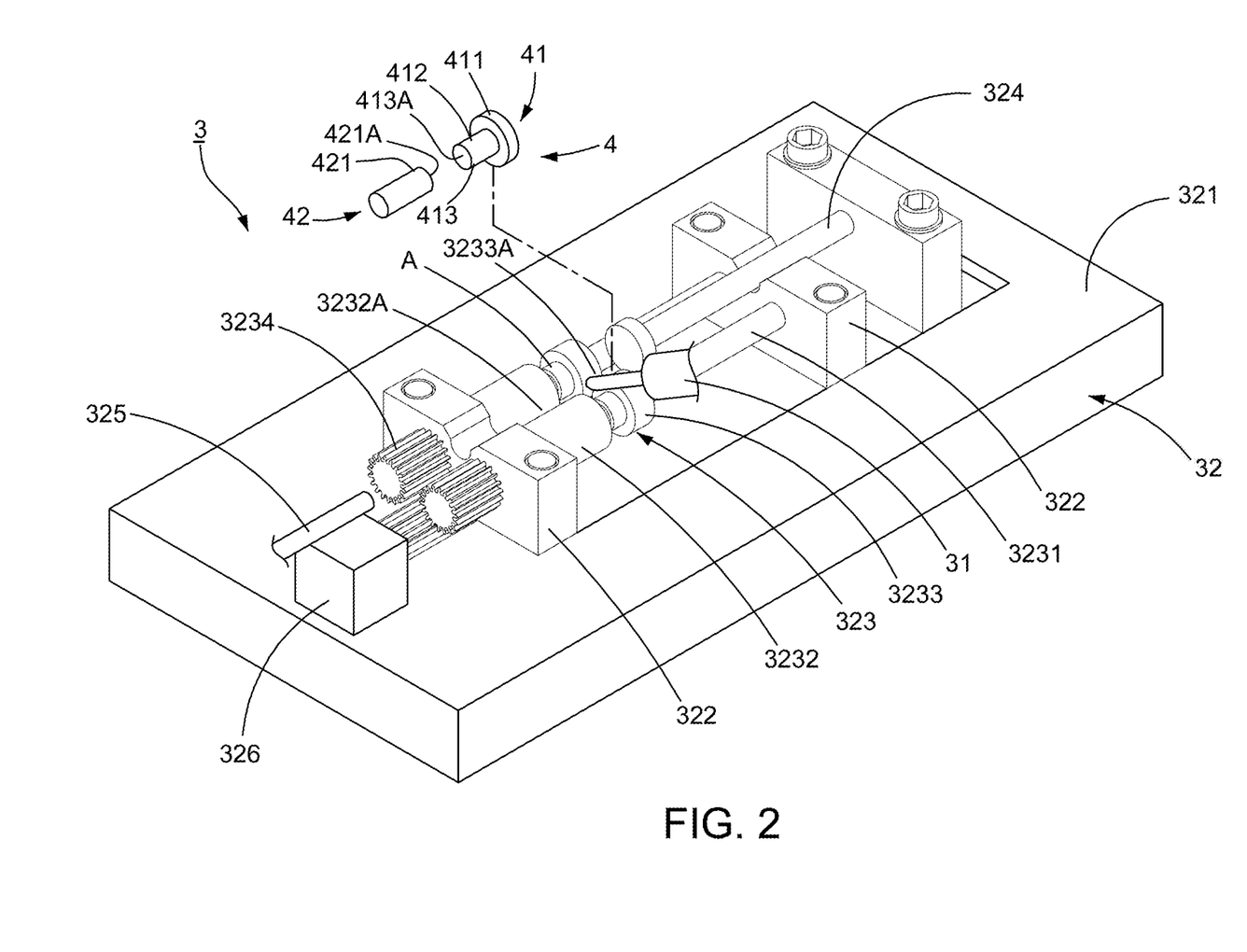
FIG. 2 is an exploded view showing the first preferred embodiment of this invention.

Referring to FIG. 1 and FIG. 2, a first preferred embodiment of a welding mechanism 3 for manufacturing a bi-compositional screw 4 of this invention is disclosed. The bi-compositional screw 4 is made through welding two different blank sections which includes a front section 41 made of a first material and a rear section 42 made of a second material different from the first material together. The front section 41 has a head 411, a shank 412 extending outwards from the head 411, and a front end 413 opposite to the head 411 and defining a front welding surface 413A. The rear section 42 has a rear end 421 relative to the front end 413 and defining a rear welding surface 421A facing the front welding surface 413A. The welding mechanism 3 includes a welding device 31 and at least one carrier 32 disposed below the welding device 31 for accommodating the front section 41 and the rear section 42 respectively. In this preferred embodiment, both of the front welding surface 413A and the rear welding surface 421A are formed in a flat surface.

Figure 3:
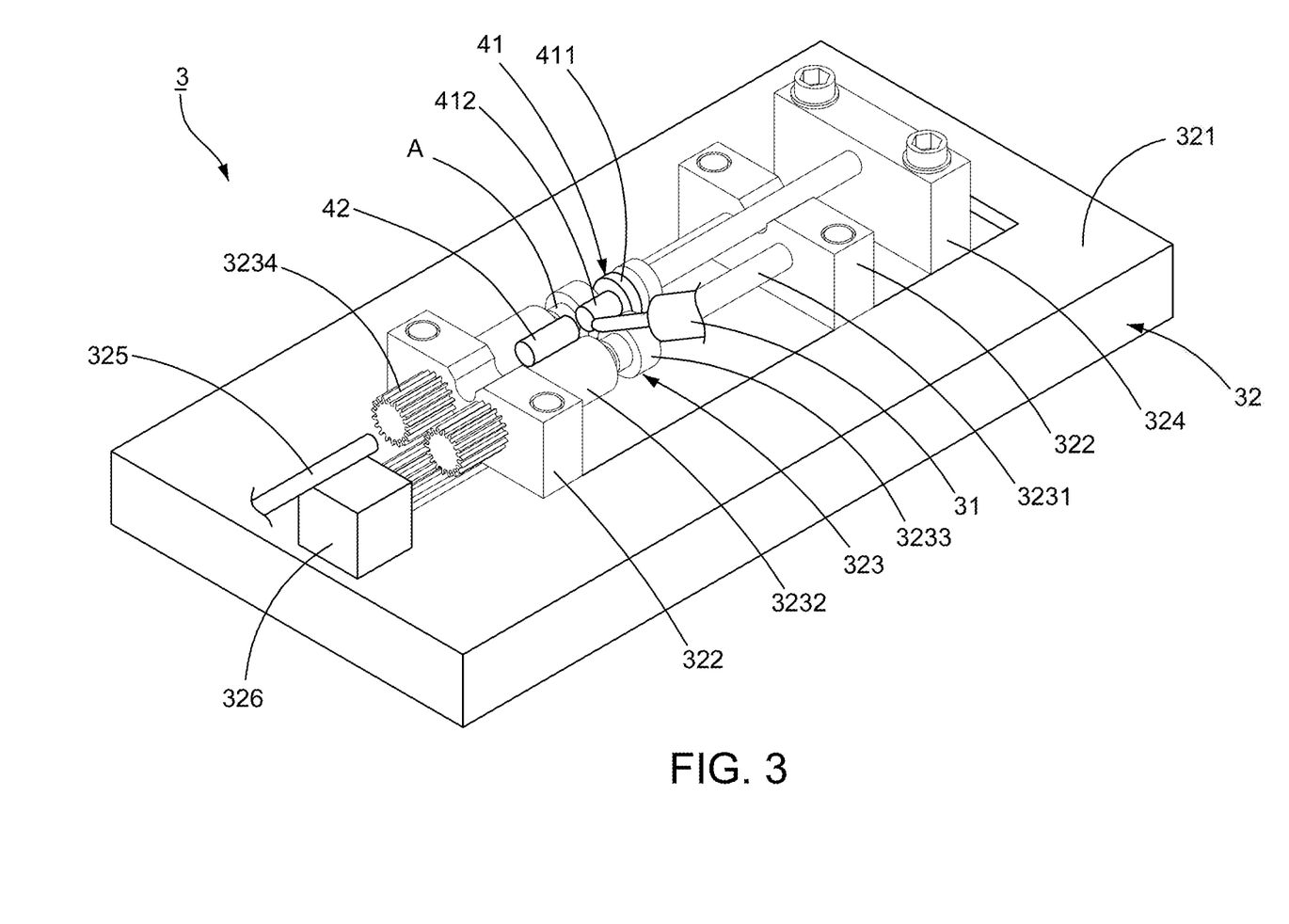
FIG. 3 is a perspective view showing that the front section and the rear section are placed relative to each other.

Referring to FIG. 2 and FIG. 3, the carrier 32 includes a base 321 disposed under the welding device 31, two opposite positioning members 322 disposed on the base 321 and spaced apart from each other, an operating set 323 disposed between the positioning members 322, a holding member 324 disposed on the base 321 and positioned relative to one of the positioning members 322, a pushing member 325 movably disposed on the base 321 positioned relative to another positioning member 322 in opposition to the holding member 324, and a power source 326 connected to the operating set 323 for supplying power in order to carry out a rotation of the operating set 323. In this preferred embodiment, the operating set 323 has two shafts 3231 pivotally disposed between the positioning members 322 and connected to and driven by the power source 326. Each shaft 3231 has a first loading portion 3232 and a second loading portion 3233 disposed in opposition to and spaced apart from the first loading portion 3232. The first loading portions 3232 of the two shafts 3231 define a first room 3232A formed therebetween for accommodating the rear section 42. The second loading portions 3233 of the two shafts 3231 define a second room 3233A formed therebetween for accommodating the front section 41.

Here takes an example that the power source 326 is a motor. In addition, the operating set 323 has two gears 3234 meshing with the power source 326 so as the gears 3234 can be driven by the power source 326. Therefore, the power source 326 can rotate the shafts 3231 through activating the gears 3234. Moreover, the first loading portions 3232 and the second loading portions 3233 are spaced apart from each other to form a recessed portion A therebetween. The recessed portion A can be set at a joint B where the first welding surface 413A and the rear welding surface 421A meet in order to suspend the joint B in the midair, namely to allow the joint B not to contact the recessed portion A, thereby smoothing the welding operation of the welding device 31. Furthermore, the first loading portion 3232 and the second loading portion 3233 can be integrally formed on each shaft 3231.

Alternatively, the first loading portion 3232 and the second loading portion 3233 can be separately disposed on each shaft 3231. And, the first and second loading portions 3232,3233 can be fixed to the shafts 3231 by a fasten unit (not shown), therefore, a length of the recessed portion A, namely the distance formed between the first loading portions 3232 and the second loading portions 3233, can be adjusted according to the length of the bi-compositional screw 4. Here takes an example that the first and second loading portions 3232,3233 are integrally formed on the shafts 3231.

A space formed between the holding member 324 and the second loading portions 3233 can be adjusted by moving the holding member 324 forward or backward according to the thickness of the head 411 which is defined between an edge formed at a bottom end of the front section 41 opposite to the front welding surface 413A and an edge connected to the shank 412, thereby restricting the head 411 between the holding member 324 and the second loading portions 3233 tightly and accommodating the shank 412 and the front end 413 in the second room 3233A. Meanwhile, the push member 325 presses and pushes the rear section 42 toward a direction of the holding member 324 to allow the rear welding surface 421A of the rear section 42 to contact with the front welding surface 413A of the front section 41 closely and meet at the joint B. When the power source 326 carries out a rotation of the shafts 3231 and simultaneously rotates the front section 41 and the rear section 42, the welding device 31 circumferentially welds at the joint B to further combine the front and rear sections 41,42 into the bi-compositional screw 4.

Figure 4:
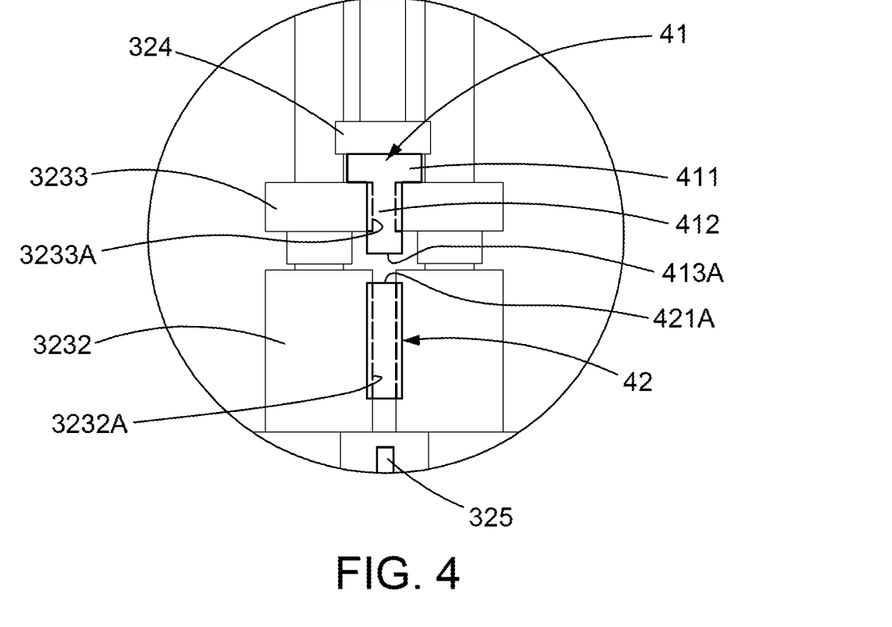
FIG. 4 is a schematic view showing that the front welding surface of the front section and the rear welding surface of the rear section are separated.

Referring to FIG. 3 and FIG. 4, during the welding operation, the space formed between the holding member 324 and the second loading portions 3233 is adjusted by changing a location of the the holding member 324 forward or backward to narrow or broaden the space based on the thickness of the head 411 in order to engage the head 411 tightly.

Figure 5:
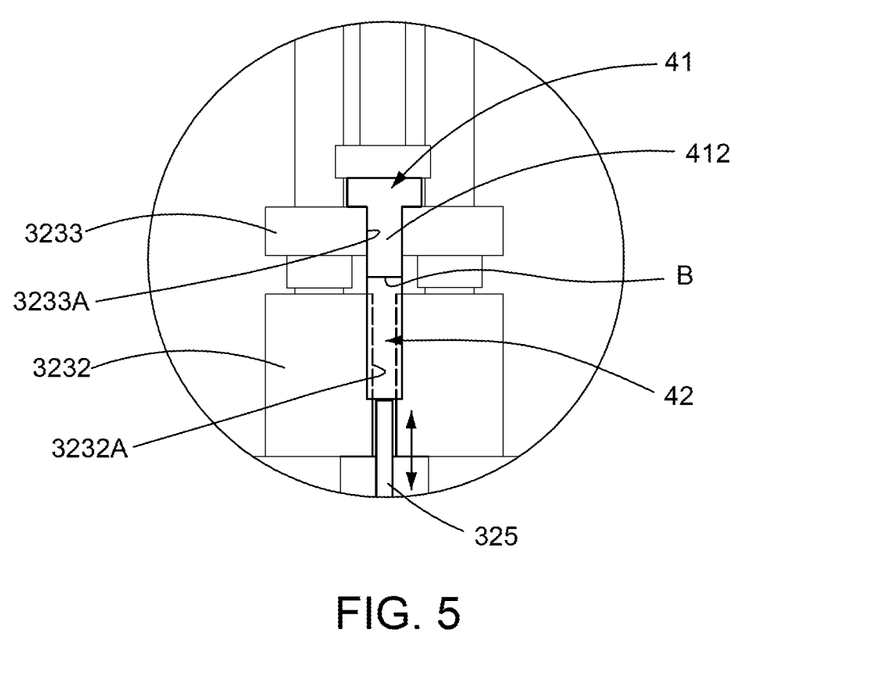
FIG. 5 is a schematic view showing that the rear section is pushed to allow the rear welding surface to contact with the front welding surface of the front section and meet at the joint.
Figure 6:
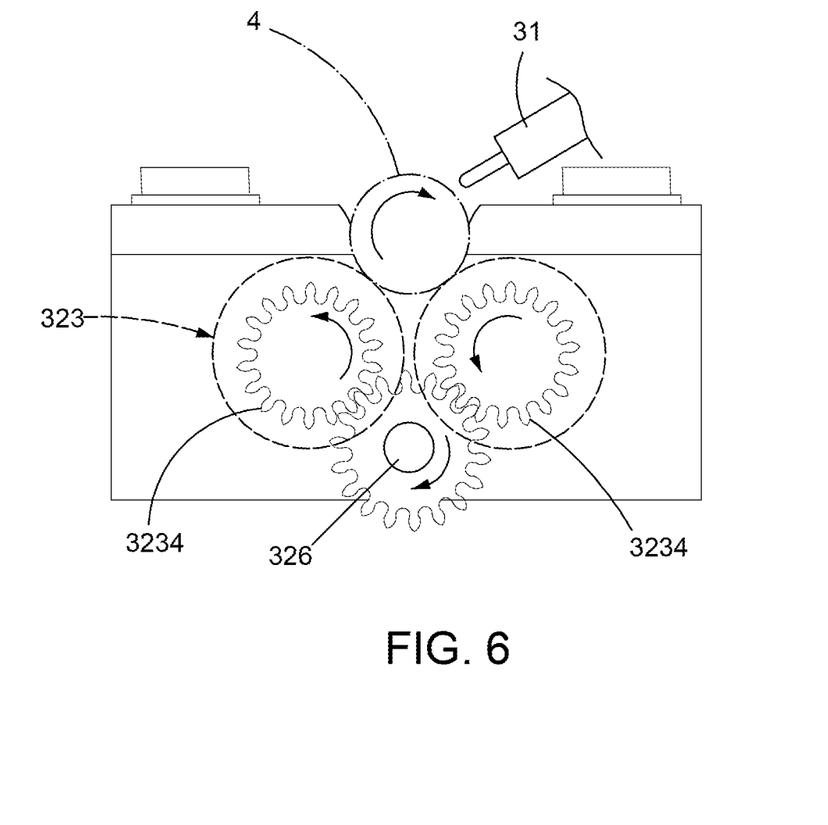
FIG. 6 is a schematic view showing that the welding device welds the front and rear sections at the joint circumferentially during the rotation of the front and rear sections.

After that, the recessed portion A formed between the first loading portions 3232 and the second loading portions 3233 is adjusted based on the length of the rear section 42 in order to allow the joint B to locate above the recessed portion A. The front section 41 is then placed at the second room 3233A to allow the head 411 to be restricted by the holding member 324 and the rear section 42 is placed at the first room 3232A. Referring to FIG. 5, the pushing member 325 pushes the rear section 42 toward the direction of the holding member 324 to allow the rear welding surface 421A to tightly contact with the front welding surface 413A and meet at the joint B. Referring to FIG. 6, the power source 326 then carries out a rotation of the gears 3234 and simultaneously rotates the shafts 3231. The shafts 3231 further drive the first loading portions 3232 and the second loading portions 3233 to rotate in the same rotational direction thereafter. When the front section 41 and the rear section 42 rotate synchronously along with the rotation of the first loading portions 3232 and the second loading portions 3233, the welding device 31 circumferentially welds at the joint B, namely a periphery of the joint B, to integrate the front and rear sections 41,42 into the bi-compositional screw 4. The bi-compositional screw 4 can be further processed to roll a plurality of threads (not shown) on the shank 412 and a drilling portion (not shown) on another end of the rear section 42 opposite to the rear end 421. Hence, the welding operation is executed by circumferentially welding at the joint B where the front and rear sections 41,42 meet, thereby preventing the generation of air and pores inside the joint B after welding, increasing the processing quality, and reducing the processing costs.

Figure 7:
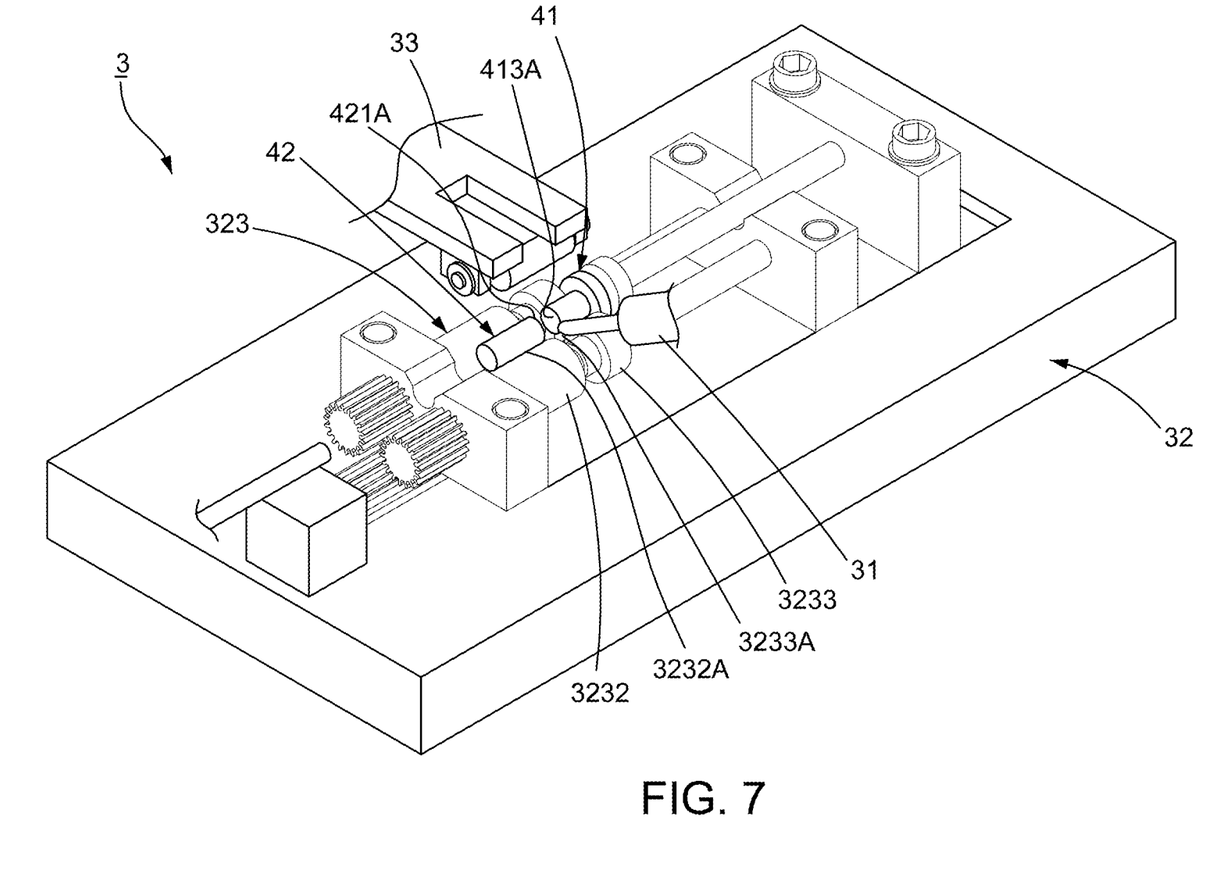
FIG. 7 is a perspective view showing a second preferred embodiment of this invention that a presser is disposed above the carrier.
Figure 8:
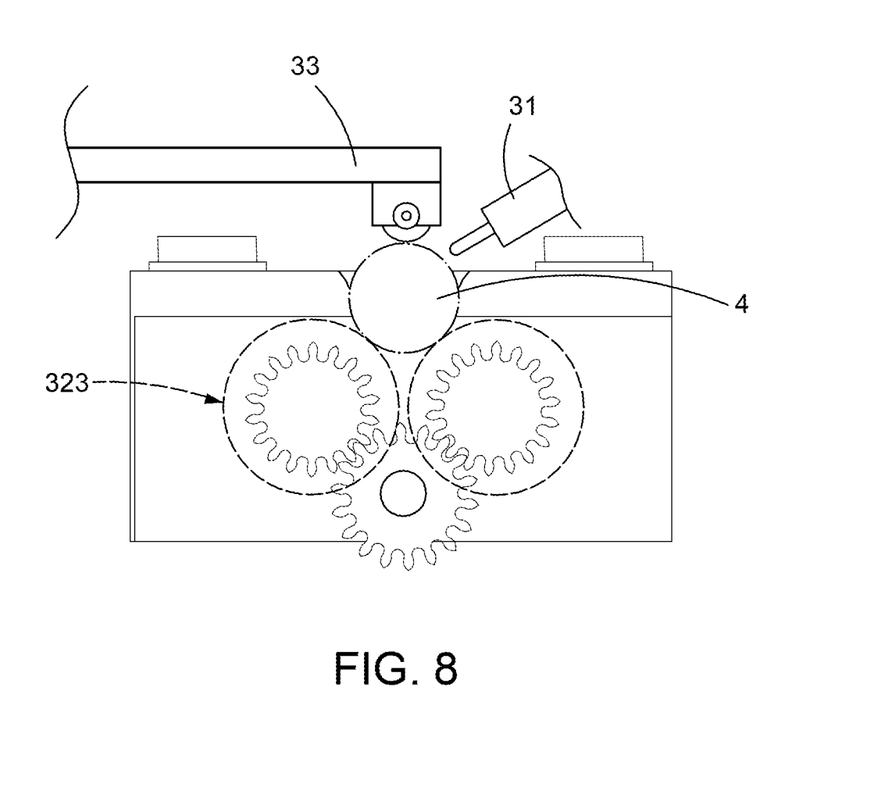
FIG. 8 is a schematic view showing that the presser restricts a movement of the front section and the rear section.

Referring to FIG. 7 and FIG. 8 show a second preferred embodiment of the welding mechanism 3 of this invention which still includes the welding device 31 and the carrier 32. The correlated elements and the concatenation of elements, the operation and objectives of the second preferred embodiment are the same as those of the first preferred embodiment. This embodiment is characterized in that a presser 33 is disposed above the carrier 32 and located relative to the operating set 323 for restricting a movement of the front section 41 and the rear section 42. Hence, after the pushing member 325 pushes the rear section 42 to contact the rear welding surface 421A with the front welding surface 413A together closely, the presser 33 then moves downwards to press the front and rear sections 41,42 to limit the positions of the front and rear sections 41,42 at the first room 3232A and the second room 3233A respectively. Therefore, the front and rear sections 41,42 are welded while being pressed by the presser 33 to increase the stability of welding effectively.

To sum up, the welding mechanism for manufacturing a bi-compositional screw of this invention take advantages that the operating set has the separate rooms for accommodating the front and rear sections respectively. The holding member restricts the head and further restricts the movement of the front section while the pushing member pushes the rear section to contact the front and rear welding surfaces together closely at the joint. Afterward the power source carries out the rotation of the operating set and synchronously rotates the front and rear sections in the same rotational direction.

Meanwhile, the welding device circumferentially welds at the joint with the rotation of the front and rear sections to integrate the front and rear sections into the bi-compositional screw, thereby preventing air and pores from generating inside the joint, increasing the processing quality, and reducing the processing costs.

While the embodiments of this invention are shown and described, it is understood that further variations and modifications may be made without departing from the scope of this invention.

What is claimed is:

1. A welding mechanism for manufacturing a bi-compositional screw, said welding mechanism serving to weld different blank sections, including a front section made of a first material and a rear section made of a second material different from said first material of said front section, an end of said front section forming a front welding surface, an end of said rear section forming a rear welding surface facing said front welding surface;

wherein said welding mechanism comprises a welding device and at least one carrier disposed under said welding device for positioning said front section and said rear section, said at least one carrier including a base located below said welding device, two opposite positioning members disposed on said base, an operating set disposed between said two positioning members and defining two separate rooms for accommodating said front section and said rear section respectively and a recessed portion formed between said two rooms for accommodating a joint at which said front section and said rear section meet, a holding member movably disposed on said base and located relative to and guided by one of said positioning members having a guide recess, a pushing member movably disposed on said base and located relative to and guided by another positioning member having another guide recess, and a power source connected to said operating set for rotating said operating set independent of said holding member and said pushing member, wherein said front section and said rear section are placed in said two rooms of said operating set to allow said holding member to touch and hold said front section in position and allow said pushing member to push said rear section in a direction of said holding member to thereby cause said rear welding surface to be in close contact with said front welding surface and form said joint which is positioned at said recessed portion, said power source carrying out a rotation of said operating set whereby said front section and said rear section rotate simultaneously, said welding device which is located above said recessed portion welding said end of said front section and said end of said rear section together at said joint in a circumferential direction under the rotation of said front section and said rear section to thereby form a bi-compositional screw.

2. The welding mechanism as claimed in claim 1, wherein said operating set has two shafts pivotally disposed between said positioning members and connected to and driven by said power source, and a first loading portion and a second loading portion respectively disposed on each of said shafts, said rooms including a first room formed between said first loading portions of said two shafts for accommodating said rear section and a second room formed between said second loading portions of said two shafts for accommodating said front section.

3. The welding mechanism as claimed in claim 1, wherein a presser is disposed above said carrier and located relative to said operating set for restricting a movement of said front section and said rear section.

4. The welding mechanism as claimed in claim 2, wherein a presser is disposed above said carrier and located relative to said operating set for restricting a movement of said front section and said rear section.

5. The welding mechanism as claimed in claim 1, wherein said operating set has two gears meshing with said power source.

6. The welding mechanism as claimed in claim 2, wherein said operating set has two gears meshing with said power source.

7. The welding mechanism as claimed in claim 2, wherein said first loading portions and said second loading portions of said operating set are spaced from each other.

8. The welding mechanism as claimed in claim 1, wherein both of said front welding surface and said rear welding surface are formed in a flat surface.

9. The welding mechanism as claimed in claim 2, wherein both of said front welding surface and said rear welding surface are formed in a flat surface.

* * * * *